July 8, 1952  C. W. MONTGOMERY ET AL  2,602,811
SYNTHESIS OF HYDROCARBONS
Filed Dec. 28, 1949
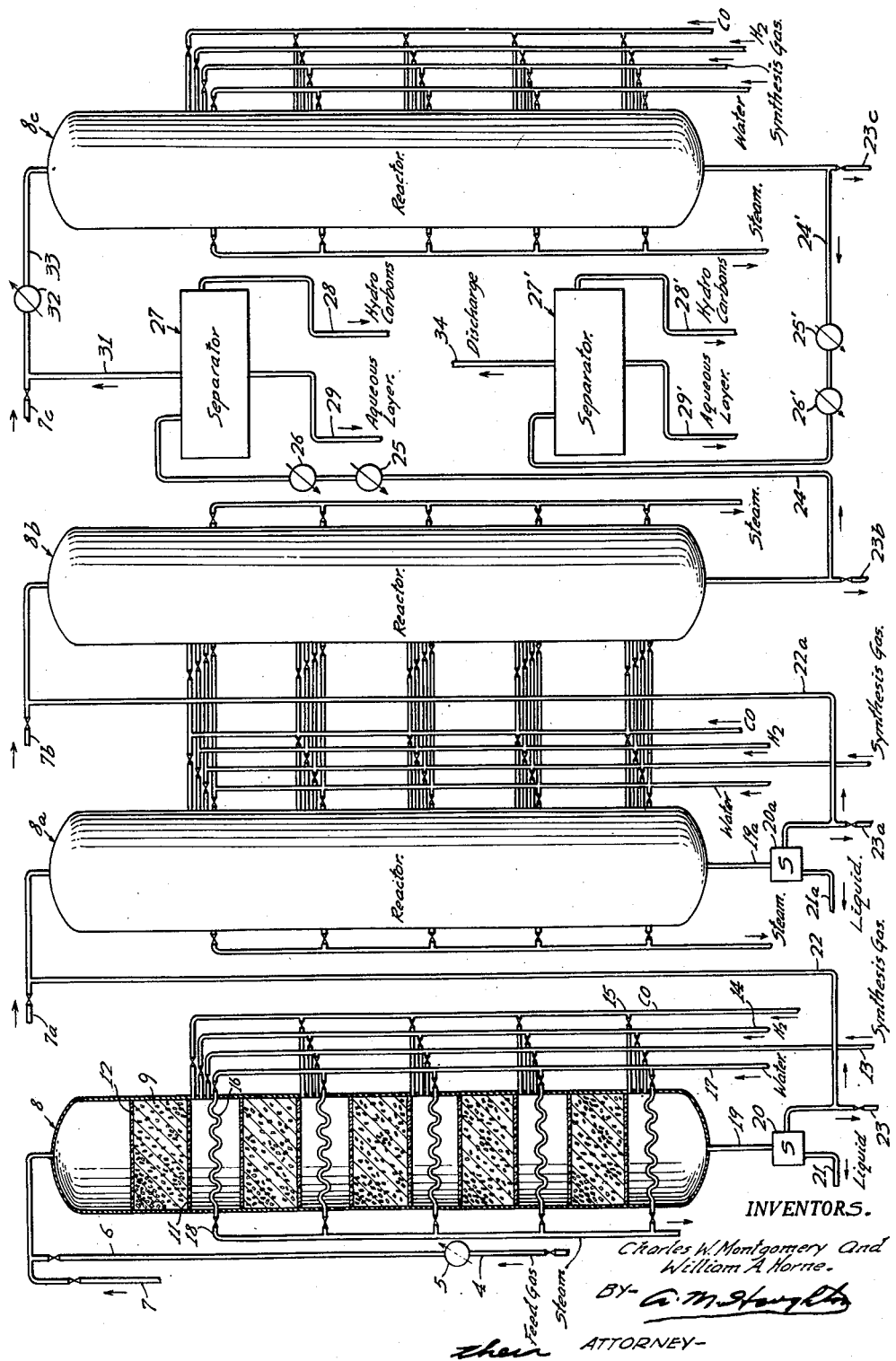
INVENTORS.
Charles W. Montgomery and
William A. Horne.
BY their ATTORNEY Patented July 8, 1952

2,602,811

UNITED STATES PATENT OFFICE 2,602,811

SYNTHESIS OF HYDROCARBONS

Charles W. Montgomery and William A. Horne, Oakmont, Pa., assignors to Gulf Research & Development Company, Pittsburgh, Pa., a corporation of Delaware Application December 28, 1949, Serial No. 135,442

8 Claims. (Cl. 260—449.6)

This invention relates to the production of hydrocarbons by the reaction between hydrogen and carbon monoxide. More particularly the invention relates to a process for the production of hydrocarbons from hydrogen and carbon monoxide utilizing a series of fixed catalyst beds.

In the production of hydrocarbons containing three or more carbon atoms, such as hydrocarbons boiling within the gasoline and gas oil boiling ranges, and wax hydrocarbons, by means of the reaction between hydrogen and carbon monoxide, problems arise because of the economic necessity of maintaining long catalyst life with a high conversion of the carbon monoxide introduced to the process to the desired products and because of the highly exothermic nature of the reaction.

It is important that the catalyst remain effective for long periods before regeneration is necessary and that it be capable of being used in a plurality of on-stream periods because of the initial cost of the catalyst and the cost of charging it to the unit. The on-stream life of the catalyst is perhaps more important because of the considerable period of time necessary for regenerating the catalyst and placing the unit fully on stream.

It is essential that as much as possible of the carbon monoxide introduced to the process be converted to useful products because this compound cannot be effectively recovered.

In the past, attempts have been made to obtain the desired temperature control by carrying out the reactions in a plurality of catalyst tubes of relatively small cross-sectional area immersed in a heat transfer medium. Difficulties have arisen because of the initial, operating, and maintenance costs of the equipment. Other methods of temperature control have also been suggested in publications, such as using a fixed bed of catalyst in an adiabatic manner and recycling a large portion of the product gases. In addition to the pumping difficulties these processes have suggested recycling gas of a composition which would materially reduce the effective life of the catalyst.

We have discovered in accordance with the invention that a large amount of the carbon monoxide present is converted to useful products, long catalyst life is obtained, and the exothermic reaction is readily controlled in relatively simple equipment by carrying out the reaction between hydrogen and carbon monoxide as described below. The process comprises passing into contact with a series of beds of iron synthesis catalyst, at a hydrocarbon synthesis temperature and pressure, a reaction mixture comprising hydrogen and carbon monoxide and containing initially no more than 2 per cent carbon monoxide, at least 80 per cent hydrogen and diluents consisting essentially of nitrogen and carbon dioxide, the ratio of hydrogen to carbon monoxide in the reaction mixture being at least 40:1, adding between each of the beds make-up gas comprising carbon monoxide, the amount of the make-up gas being adjusted to obtain a reaction gas mixture fed to the last of the beds comprising a maximum carbon monoxide content of no more than 4 per cent and a minimum ratio of hydrogen to carbon monoxide of at least 15:1. The reaction mixture is introduced at a rate to produce a substatnial temperature gradient of from 100° to 200° F., and preferably from 125° to 165° F. across the first catalyst bed. The reaction mixture fed to the first bed is preheated and the reaction mixtures fed to the subsequent beds are cooled to a reaction initiation temperature of from about 430° to about 525° F., in each case the temperature depending upon the composition of the mixture and the catalyst and its activity in the bed into which the mixture is introduced. In general it is preferred to operate so that the maximum temperature at the exit side of the catalyst bed is between about 610° to about 630° F. Operating under these conditions, a temperature gradient of from 100° to 200° F., and preferably from 125° to 165° F. is maintained in each of the catalyst beds. The hot products of reaction formed are cooled to condense at least the normally liquid hydrocarbons and other compounds boiling above the hydrocarbons. Preferably the condensation is carried out so as to condense most of the $C_4$ and heavier hydrocarbons and oxygenated compounds formed in the reaction. Where the composition is expressed in terms of per cent or the ratio of hydrogen to carbon monoxide is discussed in the above paragraph and subsequently in this specification and in the claims mol per cent and mol fraction are meant unless otherwise indicated.

One embodiment of the process is characterized by maintaining the same temperature gradient across each catalyst bed. This is accomplished by gradually increasing the carbon monoxide content of the reaction gas mixture from a maximum not exceeding 2 per cent in the mixture fed to the first catalyst bed to a maximum not exceeding 4 per cent in the mixture fed to the last catalyst bed while maintaining a minimum hydrogen to carbon monoxide ratio in the reaction gas mixture fed to the last catalyst bed of more than 15:1. Maintaining the same temperature gradient across each of the beds is of particular advantage when the number of beds is large because under these conditions the catalyst beds tend to have the same service life, and it is not necessary to take the process off stream or switch to a different group of catalyst beds because one or more beds fail prematurely due to particularly difficult operating conditions. At the same time when a temperature gradient is maintained constant by gradually increasing the carbon monoxide content in the reaction gas mixture, the hydrogen to carbon monoxide ratio in the reaction gas mixture is more rapidly reduced. The rate of decrease in the hydrogen to carbon monoxide ratio in the reaction gas mixture is reduced by adding hydrogen as well as carbon monoxide in the make-up gas introduced between beds. The addition of hydrogen in the make-up gas is of particular importance when a large number of beds is used in series, because it, together with the hydrogen furnished in the reaction gas mixture fed to the first catalyst bed, supplies the hydrogen needed for reaction and for maintaining a gradually decreasing hydrogen to carbon monoxide ratio.

Another embodiment of the process is advantageously carried out, particularly when a small number of beds is used, by maintaining the amount of carbon monoxide in the reaction gas mixture fed to each of the beds substantially constant. This is achieved by controlling the amount of carbon monoxide added as make-up gas between each of the beds. When the process is operated as described each of the beds will be efficient in the conversion of carbon monoxide, and for this reason a substantially constant carbon monoxide content can frequently be obtained by adding between each bed the same amount of carbon monoxide present in the reaction mixture fed to the first catalyst bed. In this manner, the process is very economically and conveniently controlled.

When the process is operated in accordance with these or other embodiments it is readily controlled and undesirable side reactions are prevented by having the mixture of gases fed to the first catalyst bed comprise carbon monoxide, hydrogen, and diluents consisting of nitrogen and carbon dioxide and having the make-up gas introduced into subsequent beds comprise substantially pure carbon monoxide or substantially pure carbon monoxide and hydrogen.

It is preferable that the mixture fed to the first catalyst bed contain as much carbon monoxide as possible. Because of the exothermic reactions which occur during the reaction the maximum amount of carbon monoxide present in a reaction mixture is limited by the conversion of the carbon monoxide in the catalyst beds, the temperature gradient which may be permitted in the beds, and the cooling which may be carried out between the beds.

The process of the invention should be carried out to obtain high conversion of carbon monoxide, preferably at least 98 per cent, and ordinarily a catalyst bed should be taken out of service when the conversion has fallen to below 95 per cent. Temperature gradients of from 100° to 200° F. and preferably from 125° to 165° F. across each of the catalyst beds with reaction initiation temperatures in the range of from 430° to 525° F. for the gas mixture entering each bed and with maximum exit temperatures of the gas mixture from each bed of from 610° to 630° F., are productive of a long useful life for the catalyst beds. The heat which is generated to give these temperature differentials can be removed between the beds by simple heat exchange equipment.

We have found that with the carbon monoxide conversion and temperature gradients pointed out, the carbon monoxide content of the reaction gas mixture fed to the first catalyst bed of the series must not exceed 2 per cent because when the carbon monoxide content of the gas mixture comprising hydrogen, carbon monoxide, and diluents consisting essentially of nitrogen and carbon dioxide exceeds 2 per cent, the life of the catalyst is shortened. When the carbon monoxide content of the gas fed to the first bed is less than 1 per cent a very large number of beds are necessary. Preferred results are obtained when the carbon monoxide content of the gas fed to the first catalyst bed is maintained between 1.5 and 2 per cent carbon monoxide, and especially preferred results are obtained when the carbon monoxide content of the initial gas mixture is between 1.8 and 1.9 per cent.

Although the carbon monoxide content of the gas fed to the first bed cannot exceed 2 per cent, as the partially reacted gas is passed progressively through a number of catalyst beds, the diluents include not only nitrogen and carbon dioxide but also hydrocarbons formed as the process proceeds. In the presence of these hydrocarbons, because of the reactions which occur and the increased heat capacity of the compounds which are formed, the carbon monoxide content of the gases fed to the catalyst bed can be increased beyond 2 per cent without adverse effect upon the catalyst life. When the conversion is nearly complete, as much as 4 per cent carbon monoxide can be present in the reacted gases fed to the last catalyst bed. The carbon monoxide content of the reaction gas mixtures can thus be increased to a maximum of 4 per cent in the presence of the hydrocarbons formed in the process.

The gases fed to the first catalyst bed should contain as high a percentage of hydrogen as possible. For efficient results the hydrogen content of the initial feed must be above 80 per cent and preferably above 90 per cent. When the partially reacted gases have passed through a sufficient number of beds so that a large amount of lower hydrocarbons and some higher hydrocarbons have been formed, the life of the catalyst is extended under reaction conditions such as those pointed out, if the hydrogen to carbon monoxide ratio of the reaction gas mixture fed to the beds is maintained at more than 15:1 and preferably from 15:1 to 30:1. Under the conditions stated the hydrogen to carbon monoxide ratio decreases from a minimum of at least 40:1, which exists when a maximum of 2 per cent carbon monoxide and a minimum of 80 per cent hydrogen are present in the gases fed to the first catalyst bed, to a minimum of 15:1 in the reaction gas mixture fed to the last bed. The ratio will decrease slowly if the amount of carbon monoxide in the gases fed to each bed is maintained constant. However, if the temperature gradient across the beds is maintained constant, the carbon monoxide content of the gases fed to the beds is sufficiently increased so that the hydrogen to carbon monoxide ratio will decrease more rapidly. The rate of decrease can be reduced by the addition of hydrogen with the make-up gas and when a large number of beds are used it is necessary that this hydrogen be so added. In general, with an initial carbon monoxide content of from 1 to 2 per cent, the carbon monoxide content of the gases fed to the beds must be increased from .05 to .25 per cent per bed to the desired maximum content of 4 per cent in order to obtain a constant temperature gradient in each of the beds. It is preferable that the hydrogen be added uniformly throughout the process and the rate of addition of the hydrogen is adjusted so that the desired minimum hydrogen to carbon monoxide ratio is obtained.

A preferred embodiment in which the same temperature gradient is maintained in each bed will be described in connection with the accompanying drawing in which the single figure is a simplified flow sheet of a suitable plant system. Referring to the drawing, the fresh feed, comprising from 1.5 to 2.0 per cent carbon monoxide, more than 90 per cent hydrogen, and the remainder nitrogen and carbon dioxide, is fed into valved line 4 under pressure at a controlled rate. The feed gas is passed through heat exchanger 5 wherein the temperature of the gas is preferably raised to the desired reaction initiation temperature, within the range of from about 430° and 525° F. The gas is passed from the heat exchanger through valved line 6 to the fixed bed reactor 8 which is the first of a series of similar reactors that also includes reactors 8a, 8b, and 8c. The reactor 8 comprises a cylindrical vessel in which are disposed a number of solid beds of catalyst 9. The catalyst is supported on suitable foraminous supports 11 and can, if desired, be confined at its upper surfaces by similar foraminous members 12. The heated gases are introduced to the first catalyst bed at a selected rate such as a desired space velocity (volume of feed gas at standard conditions per volume of catalyst per hour) of 300 or higher. On passing through the catalyst bed, reactions take place resulting in the evolution of considerable heat. Because of the volume of gases in the charge mixture that does not take part in the reaction, running away of the temperature of the catalyst bed is prevented. However, under the conditions described there is an increase of temperature from top to bottom of the beds of about 125° to about 165° F., provided however that the maximum temperature reached does not exceed about 630° F. When temperatures higher than this are used, the catalyst life is shortened.

Considering the first catalyst bed, the partially reacted gases in which more than 95 per cent of the carbon monoxide has been converted are removed from the bottom of the bed. A mixture of gases comprising substantially pure carbon monoxide and hydrogen is introduced through valved line 13 into the gases to lower their temperature and obtain the same temperature gradient in the second bed of catalyst by adjusting the composition so that the carbon monoxide content is increased from .05 to .25 per cent. If desired, either hydrogen or carbon monoxide or both may be admitted by valved lines 14 and 15, respectively, in order to more closely adjust the composition of the make-up gases. The resultant mixture of partially reacted and make-up gases is further cooled by passing over heat exchanger 16. The heat exchanger is preferably employed for the production of steam and for this purpose water is introduced through valved line 17 and steam is removed by valved line 18. The partially reacted gases pass in series through the beds of catalyst in the reactor 8, a mixture of hydrogen and carbon monoxide being added between beds in an amount adjusted to maintain the temperature gradient across each bed constant by increasing the carbon monoxide content per bed from .05 to .25 per cent towards the maximum of 4 per cent. At the same time the original maximum hydrogen to carbon monoxide ratio is decreased towards the minimum ratio of 15:1. The partially reacted gases are passed from reactor 8 through line 19 to a liquid separator 20, where any liquid which has condensed is removed by line 21, and then through line 22 past closed by-pass line 23 to the reactor 8a. The partially reacted gases are then passed through the second reactor 8a, by line 19a to the separator 20a, and then by line 22a past closed by-pass line 23a to reactor 8b.

As the partially reacted gases pass through the beds of catalyst, the concentration of $C_4$ and heavier hydrocarbons and oxygenated compounds increases. The products can all be removed when the gases are discharged from the last of the reactors 8c. However, the method of removing the desired products can be varied. For example, part of the products can be removed as soon as their concentration begins to build up, by cooling the partially reacted gases between reactors, removing the products, and heating up the remaining partially reacted gases.

On the other hand, the gases can be cooled between beds externally by removing a side stream, cooling it, and reintroducing the cooled side stream above the bed. When this is done, part of the products can be removed particularly as the gases progress through the system and the concentration of the product gases increases.

We have found it advantageous to remove these products as soon as their concentration has begun to build up. Using an initial carbon monoxide content of from 1.5 to 2.0 per cent and a hydrogen to carbon monoxide ratio of from 65:1 to 40:1, a part of the products can be removed as soon as the hydrogen to carbon monoxide ratio of the reaction gas mixture fed to a catalyst bed drops to 30:1. When operating as described, this occurs after the gases have passed through the third reactor 8b. At this point the partially reacted gases are passed through line 24 to heat exchanger 25 and cooler 26 which is operated at a temperature of less than 120° F., for example at a temperature between about 40° and about 120° F., the specific temperature being sufficiently low to cause condensation of desired products. The gases are then passed to a conventional separator 27 in which an aqueous and a liquid hydrocarbon layer are formed. The hydrocarbons that are liquid under these conditions are removed from the system through line 28 and the aqueous layer comprising a solution of oxygenated compounds, such as aldehydes and ketones, is removed through line 29. The remaining gaseous products are passed from separator 27 through line 31 and are heated in heat exchanger 32 to a temperature of from 430° to 500° F. The heated partially reacted gases are passed by line 33 into the next reactor 8c. The reacted gases discharged from the bottom of this reactor are separated as before in a separation system such as the one containing separator 27 and the similar parts are indicated by the same number to which a prime has been added. The gases leaving the last catalyst bed because of the diluents cannot be efficiently adjusted to the desired hydrogen to carbon monoxide ratio of 15:1 and therefore the gases are not passed to another reaction vessel but instead are discharged by line 34 through a down stream pressure controller valve which is not shown.

In many cases the beds of catalyst are subjected to partial or complete reduction prior to being contacted with the reactor feed. This may be accomplished in the system shown by introducing hydrogen through line 4, raising the temperature of the hydrogen in heater 5 to a temperature, for example, of the order of 600° to 950° F. and then passing the heated gas through the reactor. The gases produced in this reducing procedure can be removed from the system through line 34. In general it is simpler to reduce the beds of catalyst in each reactor separately. This is accomplished by introducing heated hydrogen at the top of each reactor through lines 7, 7a, 7b, and 7c, respectively, and withdrawing gases produced through valved by-pass lines 23, 23a, 23b, and 23c. In like manner the catalyst can be regenerated by oxidation with an oxygen-containing gas such as air by introducing air through lines 23, 23a, 23b, and 23c and removing products of combustion through lines 7, 7a, 7b, and 7c.

The iron synthesis catalysts employed in the present process can be in the completely oxidized, partially oxidized, or completely reduced state and can, if desired, be employed in conjunction with suitable promoters such as alumina and potassium oxide and can be disposed on suitable supports such as fullers' earth, activated alumina, acid-treated montmorillonite clays and the like. Iron catalysts prepared by precipitation of iron oxide are particularly valuable, especially when employed in the unpromoted state. The extent of reduction of these catalysts has an important effect upon their value in the process. Thus, superior results are obtained when the catalyst has been from 10 to 100 per cent reduced from the oxide and preferably from 50 to 100 per cent reduced from the oxide. The effect of the extent of the reduction of the catalyst is felt most strongly during the period when the unit is being placed on stream although this extent of reduction also has an important effect on the character of the products obtained.

As previously indicated, if the maximum temperature is controlled, excellent results are obtained in the present process by maintaining a substantial temperature gradient across each catalyst bed. When using a partially reduced iron oxide catalyst the temperature of the initial charge mixture may be of the order of 430° to 450° F. and under the conditions stated the maximum temperature at the exit of the bed will be about 600° to 630° F. On the other hand, when using an oxide catalyst it is necessary that the mixture be treated to the order of 500° F. in order to initiate reaction.

All of the catalyst beds in a reactor can comprise catalyst which is in the same completely oxidized, partially oxidized, or completely reduced state. On the other hand, if desired, the degree of reduction may vary in the various beds within the same reactor. For example, the catalyst beds in a reactor can be reduced so that the first bed comprises partially reduced iron oxide, the subsequent beds each comprise iron oxide in a progressively less reduced state and the last bed comprises iron oxide which is not reduced. Such a reactor has the advantage that the reaction mixture fed to the first bed must only be preheated to a reaction initiation temperature of about 430° to 450° F. while the reaction mixture fed to each successive bed must only be cooled to a progressively higher reaction initiation temperature, the reaction initiation temperature for the reaction mixture fed to the bed containing the non-reduced iron oxide being about 500° F. Because a higher reaction temperature is used in the later beds, the cooling between these beds is simplified.

A number of reactors may be used, each having catalyst beds in varying states of reduction. In addition, a series of reactors may be employed in which the catalyst beds within each reactor are in the same state of reduction as the other beds in the same reactor but in which the beds of each reactor are reduced to a different extent than those in the other reactors. For example, in a conversion unit composed of four reactors, the catalyst beds in the first reactor may be 75 per cent reduced, those in the second bed 50 per cent reduced, those in the third 25 per cent and those in the last reactor may contain iron oxide which is not reduced.

The sequence in which the various reactors containing a number of beds of catalyst are used can be varied. By using a larger number of reactors at least one of the reactors can be regenerated or the degree of reduction of its catalyst beds can be changed while the other reactors are on stream. The reactor can contain varying numbers of beds but it usually contains from 4 to 10 beds because with less than four beds the advantages of the process are not obtained while for structural and economic reasons ten beds are usually the limit in a single reactor.

There will now be described a presently preferred method of carrying out the process of our invention in which the same temperature gradient is maintained in each catalyst bed. These runs are carried out in a series of reactors each about 25 feet high with an internal diameter of 6 feet. In each reactor there are five catalyst beds equally spaced with heat exchangers disposed after each of the beds.

The catalyst is prepared as a precipitated iron oxide which analysis indicates to be $Fe_2O_3$ with only traces of other metals. The catalyst is formed in a conventional pelleting machine into cylindrical pellets about one-eighth of an inch in diameter and about one-eighth of an inch in height. Into each catalyst bed comprising a volume of 56.5 cubic feet, about 7,500 pounds of catalyst are charged. The reactor is part of a system such as disclosed in the drawing. As previously pointed out, cooling between the beds may be carried out either within or outside the shell.

The catalyst is then dried, for example by passing the gas over the catalyst at a temperature of about 250° F. to 300° F. for about 3 hours. The drying and the subsequent reactions are most conveniently carried out by introducing the gas separately into the bottom of each reactor and removing the reaction or inert gases from the top of the reactor. If desired, it is of course possible to pass either a reactant or a scrub gas through all of the reactors arranged in series. However, it is usually more convenient to activate the catalyst in each reactor separately. Hydrogen is a very convenient drying gas because it does not result in the formation of any impurities; however, an inert gas can be used but it must be flushed from the system as the catalyst is dried. At this stage the catalyst in the various reactor beds is in the form of oxide and can be so used if desired. However, when completely or partially reduced catalysts are to be prepared, heated hydrogen gas is then flowed over the catalyst at one atmosphere pressure at a space velocity of about 1150. When the catalyst beds have been heated to a temperature of about 510° F., reduction of the catalyst begins to occur. The passage of heated hydrogen in contact with the catalyst is continued until the desired degree of reduction has been attained, the catalyst beds reaching a temperature in the neighborhood of about 650° F. early in the reduction period. The degree of reduction can readily be determined by determining the amount of water which has been formed in the reduction procedure. At times it is desirable to introduce the hydrogen separately to the various beds or to reverse the direction of flow in order that the first beds contacted with the hydrogen are not overheated before the last beds are at the desired condition.

The procedures just described are followed not only when preparing a catalyst initially but also when readying a catalyst for use after it has been regenerated. The procedure can also be applied separately to one or more of the reactors after they have been regenerated while the remaining reactors remain on stream.

The reactors are placed on stream by introducing hydrogen and bringing the pressure up to about 150 pounds per square inch. Each of the catalyst beds is brought up to the temperature required for the initiation of the reaction, the specific temperatures being in the range of 430° to 450° F. for the partially reduced iron oxide catalyst. At this time 600 cubic feet per minute of a reactive mixture are introduced into the first reactor. This reactive mixture comprises 1.9 per cent carbon monoxide, 5.9 per cent nitrogen, 2 per cent carbon monoxide, and 90.2 per cent hydrogen. Make-up gas comprising 24 cubic feet of hydrogen and 12 cubic feet of carbon monoxide is introduced after the first reactor bed. In subsequent beds the amount of these make-up gases is increased until in the last bed 48 cubic feet of hydrogen and 24 cubic feet of carbon monoxide are added.

The reactive feed to the first bed is gradually increased to 6000 cubic feet per minute causing a temperature gradient of 150° F. through the various beds. The hydrogen and carbon monoxide in the make-up gas beneath the first bed are increased to 236 and 118 cubic feet and the progressive increase of these gases between beds is 12.2 and 6.1 cubic feet, respectively. This causes an increase of about 0.1 per cent carbon monoxide per bed, a gradual reduction from the initial hydrogen to carbon monoxide ratio of 47:1 to 15:1, while maintaining the temperature gradient in each bed at about 150° F.

When full operating conditions are obtained, the space velocity through the first bed is of the order of 6370, the space velocity through the subsequent beds is higher, the space velocity through the last bed being of the order of 9650.

At the end of the lining-out period the fresh feeds are being introduced at the reaction initiation temperature into each of the catalyst beds. When the gases are removed from the third reactor they are cooled to about 60° F. while maintaining the pressure in the neighborhood of about 150 pounds per square inch and are then passed into a separator wherein a separation of the liquid and gaseous materials is accomplished. The partially reacted gases are then passed out of the separator, are reheated and introduced to the fourth reactor. After this reactor the products are again separated in the same manner. The inlet temperatures for the various beds are increased slightly as the run progresses in order to counteract the decrease in carbon monoxide conversion caused by the reduction in catalyst activity. The run is continued as long as the conditions of operation described previously are maintained. The most striking indication of unsatisfactory operation is the drop in the conversion of carbon monoxide caused by a reduction in catalyst activity. The partially reacted gases must be diverted to one or more different reactors when the carbon monoxide conversion in the reactors falls below 95 per cent and the reactors which have been on stream must be regenerated.

The catalyst in the reactors which are to be reactivated are then regenerated in the following manner. The reactor is flushed with an inert gas and then a small stream of air (about 65 cubic feet per minute) and a stream of nitrogen (about 180 cubic feet per minute) are introduced. The products of regeneration can be recycled to the catalyst bed at a rate of about 1500 to 1750 cubic feet per minute. The catalyst peak temperature is about 450° F. under these conditions. The air rate is then gradually increased to about 450 cubic feet per minute and the nitrogen feed cut to zero. The peak temperature of the catalyst is gradually increased to about 950° F. where it is maintained throughout most of the regeneration period, which usually occupies a total time of about 36 hours. The regenerated catalyst after successive on-stream periods is in substantially the same position as the fresh catalyst introduced into the reactor.

As pointed out before, in one embodiment the process is operated by replacing the carbon monoxide consumed in each bed. When operating in this manner, an initial carbon monoxide content of from 1.5 to 2 per cent and preferably from 1.8 to 1.9 per cent is employed. At least 95 per cent, preferably 98 per cent, of the carbon monoxide is consumed in the first bed. This carbon monoxide is replaced by a make-up gas of substantially pure carbon monoxide. The carbon monoxide which is consumed in each of the subsequent beds is in turn replaced by make-up gas before the following bed. A temperature gradient of from 100° to 200° F. and preferably from 125° to 165° F. is employed in each of the beds, the temperature gradient varying within the various catalyst beds and gradually decreasing as the carbon monoxide content of the gas mixture increases due to the formation of hydrocarbons. Although this embodiment of the process is particularly advantageous when applied to a series of beds in which a small number of beds are employed, preferred results are obtained only when the series comprises four or more beds of catalyst.

An embodiment of the process in which the carbon monoxide content consumed in each bed is replaced in the subsequent bed in a reactor system such as the one presented in Figure 1 will now be described.

Referring to the drawing, the reactors 8, 8a, 8b and 8c are placed on stream by introducing hydrogen and bringing the pressure up to about 150 pounds per square inch. Each of the catalyst beds in the reactors is brought up to the temperature required for the initiation of the reaction, the specific temperatures being in the range of 425° to 450° F. At this time 600 cubic feet of synthesis gas comprising 1.9 per cent carbon monoxide, 5.9 per cent nitrogen, 2 per cent carbon dioxide, and 90.2 per cent hydrogen are introduced by means of valved line 4 to the heater 5 where the gas is raised to the desired synthesis initiation temperature; for example, a temperature such as 450° F. The gas is passed from the heat exchanger through valved line 6 to the first reactor 8. The gas is then passed through catalyst bed 9 wherein about 98 per cent of the carbon monoxide is converted. The gases are removed from the catalyst bed and 11.2 cubic feet of carbon monoxide are added by means of line 15. The heat which has been generated is removed by the heat exchanger 16 and the mixture of gas is passed to the next catalyst bed. The partially reacted gases are removed from the first reactor 8 by means of line 19 and are then passed to a liquid separator 20 where any liquid which has condensed is removed by line 21. The gases are then passed through line 22 to the next reactor 8a through the beds of catalyst in this reactor, where carbon monoxide is added after each bed to replace the carbon monoxide consumed in that bed and the partially reacted gases are then in turned passed to the third reactor 8b. After passing through the third reactor 8b in a similar manner, the carbon monoxide consumed in each bed being replaced immediately after the bed, the gases are passed to the separator 27. In this separator hydrocarbons are removed by means of line 28 and an aqueous layer is removed by means of line 29. The gases are then passed through the last reactor, the carbon monoxide being replaced after each bed, and after passing through the reactor are passed to the separator 27' where the hydrocarbons, the aqueous layer and the unconverted gases are again separated and the remaining gas is discharged through line 34.

The rate of introduction of feed gas is gradually increased from 600 to 6000 cubic feet per minute and the rate of introduction of make-up gas is increased to 111.7 cubic feet per minute beneath each of the catalyst beds in order to replace the carbon monoxide which is consumed in the previous bed. When full operating conditions are reached, the space velocity through the first bed is about 6,370 and the space velocity in the following beds is somewhat lower, the space velocity in the last bed being about 1,970.

The process can be operated by introducing 114 cubic feet per minute of carbon monoxide, the amount of carbon monoxide present in the reactive mixture fed to the first bed, instead of 111.7 cubic feet per minute. This will cause an increase in the amount of carbon monoxide fed to each successive bed but the amount will be small and the process can be conveniently operated.

The cycle of operations in the present process comprises the periods described; a period for drying and reducing the catalyst if a completely or partially reduced catalyst is used; a lining-out period; a reaction period; and a regeneration period. The lining-out period and the reaction period, during both of which hydrocarbons are produced, are together referred to as the on-stream period.

It will be understood that the conditions disclosed can be varied within the scope of the invention. While it is generally preferred to carry out the process at a pressure of about 150 pounds per square inch, other superatmospheric pressures can be used, such as pressures within the range of about 50 to about 650 pounds per square inch. Because the pressure does not appear to have a critical effect on the process, higher pressures can be used but are not preferred because their use requires specially designed equipment. Also, provided the other conditions of the process are maintained within the limits described above, the fresh feed space velocity can be varied, the only considerations being the practical ones of overcoming pressure drop through the catalyst beds when high space velocities are employed and of an economical throughput at lower space velocities.

We have stated that the initial reactor feed should be heated prior to being contacted with the catalyst at least to the reaction initiation temperature, which varies depending upon the specific catalyst employed and the activity of the catalyst. The mixture of gases fed to the first catalyst bed as we have stated should contain less than 2 per cent carbon monoxide and not less than 80 per cent hydrogen. Preferably the mixture should contain from 1.8 to 1.9 per cent carbon monoxide and more than 90 per cent hydrogen. We have stated that a make-up gas comprising carbon monoxide can be added after each bed in an amount adjusted to replace the carbon monoxide consumed in the prior bed or that it can be added after each bed to gradually increase the carbon monoxide content of the reaction gas mixture from 0.05 to 0.25 per cent per bed to a maximum of 4 per cent while at the same time decreasing the hydrogen to carbon monoxide ratio from a maximum as high as 99:1 to a minimum as low as 15:1 while maintaining the same temperature gradient in each bed. When it is desired to decrease the hydrogen to carbon monoxide ratio more slowly, such as when a larger number of catalyst beds is employed, the make-up gas comprises hydrogen and carbon monoxide, the amount of hydrogen being determined to give a gradual decrease from the maximum to the minimum hydrogen to carbon monoxide ratio while obtaining the same temperature gradient in each bed.

We have also stated that the process can be carried out so as to compensate for a decrease in activity of the catalyst by increasing the temperature during an on-stream period. While hydrocarbons can be produced under other temperature conditions, in general we prefer to maintain this reactor feed or inlet temperature when using a partially or completely reduced iron catalyst within the range of about 430° to about 475° F., the lower temperatures being employed when the catalyst is relatively fresh, either a new catalyst or regenerated catalyst, and the temperature being gradually increased towards the latter part of a run. When using an iron oxide catalyst we have found that ordinarily reaction is not initiated unless the reactor feed is heated to at least about 490° F., and better about 500° F. During a run this temperature is preferably increased but the maximum should not ordinarily exceed about 530° F.

Obviously many modifications and variations of the invention, as hereinbefore set forth, may be made without departing from the spirit and scope thereof, and therefore only such limitations should be imposed as are indicated in the appended claims.

We claim:

1. A process for the production of hydrocarbons by reaction between hydrogen and carbon monoxide which comprises passing into contact with the first of a series of beds of iron synthesis catalyst at hydrocarbon synthesis initiation temperature of from 430° to 525° F. a reaction mixture comprising hydrogen and carbon monoxide and containing no more than 2 mol per cent carbon monoxide and at least 80 mol per cent hydrogen, the mol ration of hydrogen to carbon monoxide being at least 40:1, at a rate such as to produce a temperature gradient across said first bed of from about 100° to about 200° F., passing the partially reacted gases in contact with the remaining beds of the series, adjusting the carbon monoxide content of the partially reacted mixture flowing between each pair of beds by adding make-up gas comprising carbon monoxide between beds, cooling the mixture flowing between each pair of beds to a reaction initiation temperature of from 430° to 525° F., controlling the rate of addition of carbon monoxide and the extent of cooling between beds to maintain a temperature gradient across each bed of from about 100° to about 200° F. and to produce a charge mixture to each bed containing a progressively lower hydrogen to carbon monoxide mol ratio and a charge mixture flowing to the last bed with a minimum mol ratio of hydrogen to carbon monoxide of 15:1, and separating from resulting reaction products the bulk of the normally liquid and heavier hydrocarbons and oxygenated compounds formed in the reaction.

2. A process for the production of hydrocarbons by reaction between hydrogen and carbon monoxide which comprises passing into contact with the first of a series of beds of iron synthesis catalyst at hydrocarbon synthesis initiation temperature of from 430° to 525° F. a reaction mixture comprising hydrogen, carbon monoxide, and diluents consisting essentially of carbon dioxide and nitrogen, and containing no more than 2 mol per cent carbon monoxide and at least 80 mol per cent hydrogen, the mol ratio of hydrogen to carbon monoxide being at least 40:1, at a rate such as to produce a temperature gradient across said first bed of from about 125° to about 165° F. and a maximum temperature of partially reacted gases in said bed of from 610° to 630° F., passing the partially reacted gases in contact with the remaining beds of the series, adjusting the carbon monoxide content of the partially reacted mixture flowing between each pair of beds by adding make-up gas comprising carbon monoxide between beds, cooling the mixture flowing between each pair of beds to a reaction initiation temperature of from 430° to 525° F., controlling the rate of addition of carbon monoxide and the extent of cooling between beds to maintain a temperature gradient across each bed of from about 125° to about 165° F. and a maximum temperature of partially reacted gases in each bed of from 610° to 630° F. and to produce a charge mixture flowing to each bed containing a progressively lower hydrogen to carbon monoxide mol ratio and a charge mixture flowing to the last bed of the series with a maximum carbon monoxide content of 4 mol per cent and a minimum mol ratio of hydrogen to carbon monoxide of 15:1, and separating from the resulting reaction products the bulk of the $C_4$ and heavier hydrocarbons and oxygenated compounds formed in the reaction.

3. The process of claim 2 in which the make-up gas added between beds comprises hydrogen and carbon monoxide.

4. A process for the production of hydrocarbons by reaction between hydrogen and carbon monoxide which comprises passing into contact with the first of a series of beds of iron synthesis catalyst at hydrocarbon synthesis initiation temperature of from 430° to 525° F. a reaction mixture comprising hydrogen, carbon monoxide, and diluents consisting essentially of carbon dioxide and nitrogen, and containing no more than 2 mol per cent carbon monoxide and at least 80 mol per cent hydrogen, the mol ratio of hydrogen to carbon monoxide being at least 40:1, at a rate such as to produce a temperature gradient across said first bed within the range of from about 100° to about 200° F., passing the partially reacted gases in contact with the remaining beds of the series, adjusting the carbon monoxide content of the partially reacted mixture flowing between each pair of beds by adding make-up gas comprising carbon monoxide between beds, cooling the mixture flowing between each pair of beds to a reaction initiation temperature of from 430° to 525° F., controlling the rate of addition of carbon monoxide and the extent of cooling between beds to maintain the same temperature gradient across each bed within the range of about 100° to about 200° F. and to produce a charge mixture flowing to each bed containing a progressively lower hydrogen to carbon monoxide mol ratio and a charge mixture flowing to the last bed of the series with a maximum carbon monoxide content of 4 mol per cent and a minimum mol ratio of hydrogen to carbon monoxide of 15:1, and separating from resulting reaction products the bulk of the $C_4$ and heavier hydrocarbons and oxygenated compounds formed in the reaction.

5. A process for the production of hydrocarbons by reaction between hydrogen and carbon monoxide which comprises passing into contact with the first of a series of beds of iron synthesis catalyst at a hydrocarbon synthesis initiation temperature of from 430° to 525° F. a reaction mixture comprising hydrogen, carbon monoxide, and diluents consisting essentially of carbon dioxide and nitrogen, and containing no more than 2 mol per cent carbon monoxide and at least 80 mol per cent hydrogen, the mol ratio of hydrogen to carbon monoxide being at least 40:1, at a rate such as to produce a temperature gradient across said first bed within the range of from about 125° to about 165° F. and a maximum temperature of partially reacted gases in said bed of from 610° to 630° F., passing the partially reacted gases in contact with the remaining beds of the series, adding make-up gas comprising carbon monoxide between the beds to increase the carbon monoxide content of the partially reacted mixture of .05 to .25 mol per cent between each pair of beds, cooling the mixture flowing between each pair of beds to a reaction initiation temperature of from 430° to 525° F., controlling the rate of addition of carbon monoxide and the extent of cooling between beds to maintain the same temperature gradient across each bed within the range of about 125° to about 165° F. and a maximum temperature of partially reacted gases in each bed of from 610° to 630° F. and to produce a charge mixture flowing to each bed containing a progressively lower hydrogen to carbon monoxide mol ratio and a charge mixture flowing to the last bed of the series with a maximum carbon monoxide content of 4 mol per cent and a minimum mol ratio of hydrogen to carbon monoxide of 15:1, and separating from resulting reaction products the bulk of the $C_4$ and heavier hydrocarbons and oxygenated compounds formed in the reaction.

6. The process of claim 5 in which the make-up gas added between beds also comprises hydrogen added in an amount adjusted to give a gradual decrease from the minimum mol ratio of hydrogen to carbon monoxide of 40:1 in the reaction mixture fed to the first bed to the minimum mol ratio of 15:1 in the charge mixture fed to the last bed in the series.

7. A process for the production of hydrocarbons by reaction between hydrogen and carbon monoxide which comprises passing into contact with the first of a series of beds of iron synthesis catalyst at hydrocarbon synthesis initiation temperature of from 430° to 525° F. a reaction mixture comprising hydrogen, carbon monoxide, and diluents consisting essentially of carbon dioxide and nitrogen, and containing no more than 2 mol per cent carbon monoxide and at least 80 mol per cent hydrogen, the mol ratio of hydrogen to carbon monoxide being at least 40:1, at a rate such as to produce a temperature gradient across said first bed within the range of from about 125° to about 165° F., passing the partially reacted gases in contact with the remaining beds of the series, adjusting the carbon monoxide content of the partially reacted mixture flowing between each pair of beds by adding make-up gas comprising carbon monoxide between the beds, cooling the mixture flowing between each pair of beds to a reaction initiation temperature of from 430° to 525° F., controlling the rate of addition of carbon monoxide and the extent of cooling between beds to maintain a temperature gradient across each bed of from 125° to about 165° F., and to produce a charge mixture flowing to each of the beds of the series containing the same amount of carbon monoxide and a progressively lower hydrogen to carbon monoxide mol ratio and a charge mixture flowing to the last bed in the series with a minimum mol ratio of hydrogen to carbon monoxide of 15:1, and separating from resulting reaction products the bulk of the C₄ and heavier hydrocarbons and oxygenated compounds formed in the reaction.

8. A process for the production of hydrocarbons by reaction between hydrogen and carbon monoxide which comprises passing into contact with the first of a series of catalyst beds of iron synthesis catalyst, the catalyst in the first bed comprising a reduced iron oxide, at a hydrocarbon synthesis initiation temperature of from 430° to 450° F., a reaction mixture comprising hydrogen, carbon monoxide, and diluents consisting essentially of carbon dioxide and nitrogen, and containing no more than 2 mol per cent carbon monoxide and at least 80 mol per cent hydrogen, the mol ratio of hydrogen to carbon monoxide being at least 40:1, at a rate such as to produce a temperature gradient across said first bed of about 125° to 165° F., passing the partially reacted gases in contact with the remaining beds of the series, each bed containing iron catalyst in a less reduced state than the preceding catalyst bed, adjusting the carbon monoxide content of the partially reacted mixture flowing between each pair of beds by adding make-up gas comprising carbon monoxide between beds, cooling the mixture flowing between each pair of beds to a progressively higher reaction initiation temperature in the range of from 430° to 525° F. as the reaction mixture is used as charge for progressively less reduced iron oxide catalyst beds, controlling the rate of addition of carbon monoxide to maintain a temperature gradient across each bed of from about 125° to 165° F., and to produce a charge mixture flowing to each bed containing a progressively lower hydrogen to carbon monoxide mol ratio and a charge mixture flowing to the last bed of the series with a maximum carbon monoxide content of 4 mol per cent and a minimum mol ratio of hydrogen to carbon monoxide of 15:1, and separating from resulting reaction products the bulk of the C₄ and heavier hydrocarbons and oxygenated compounds formed in the reaction.

CHARLES W. MONTGOMERY.
WILLIAM A. HORNE.

REFERENCES CITED

The following references are of record in the file of this patent:

UNITED STATES PATENTS

| Number | Name | Date |
|---|---|---|
| 2,251,554 | Sabel | Aug. 5, 1941 |
| 2,433,255 | Atwell | Dec. 23, 1947 |